United States Patent
Bergström et al.

(10) Patent No.: US 12,470,990 B2
(45) Date of Patent: Nov. 11, 2025

(54) METHOD FOR NETWORK-GUIDED WD CELL RESELECTION

(71) Applicant: Telefonaktiebolaget LM Ericsson (publ), Stockholm (SE)

(72) Inventors: Mattias Bergström, Sollentuna (SE); Pradeepa Ramachandra, Linköping (SE); Riikka Susitaival, Helsinki (FI); Paul Schliwa-Bertling, Ljungsbro (SE); Christofer Lindheimer, Vadstena (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 464 days.

(21) Appl. No.: 17/914,999

(22) PCT Filed: Mar. 31, 2021

(86) PCT No.: PCT/SE2021/050290
§ 371 (c)(1),
(2) Date: Sep. 27, 2022

(87) PCT Pub. No.: WO2021/201760
PCT Pub. Date: Oct. 7, 2021

(65) Prior Publication Data
US 2023/0156546 A1    May 18, 2023

Related U.S. Application Data

(60) Provisional application No. 63/002,804, filed on Mar. 31, 2020.

(51) Int. Cl.
*H04W 36/08* (2009.01)
*H04W 36/00* (2009.01)

(52) U.S. Cl.
CPC ....... *H04W 36/08* (2013.01); *H04W 36/0072* (2013.01)

(58) Field of Classification Search
CPC .......................... H04W 36/08; H04W 36/0072
See application file for complete search history.

(56) References Cited

U.S. PATENT DOCUMENTS

2019/0174406 A1    6/2019   Hwang et al.
2020/0022095 A1*   1/2020   Kim ........................ H04W 8/08
(Continued)

FOREIGN PATENT DOCUMENTS

CN       105007606 A    10/2015
CN       109845124 A     6/2019
(Continued)

OTHER PUBLICATIONS

International Search Report and Written Opinion dated Jun. 14, 2021 for International Application No. PCT/SE2021/050290 filed Mar. 31, 2021; consisting of 11 pages.
(Continued)

*Primary Examiner* — Deepa Belur
(74) *Attorney, Agent, or Firm* — Weisberg I.P. Law, P.A.

(57) ABSTRACT

A method, network node and wireless device for network guided wireless device (WD) cell reselection are disclosed. According to one aspect, a method includes obtaining an indication of a set of parameters of a plurality of sets of parameters, the parameters in a set including at least one index and at least one priority, the index used to configure the WD to select a frequency priority based at least in part on the index. The method further includes selecting one of a network slice, frequency and service, based at least in part on the index and included in the set of parameters.

22 Claims, 11 Drawing Sheets

(56) References Cited

U.S. PATENT DOCUMENTS

| | | | | |
|---|---|---|---|---|
| 2020/0059987 | A1* | 2/2020 | Hong | H04W 36/0033 |
| 2020/0077327 | A1* | 3/2020 | Duan | H04W 76/11 |
| 2020/0120547 | A1* | 4/2020 | Han | H04W 36/0083 |
| 2022/0322176 | A1* | 10/2022 | Geng | H04W 48/20 |

FOREIGN PATENT DOCUMENTS

| | | |
|---|---|---|
| EP | 3417657 | 8/2017 |
| EP | 3627863 A1 | 3/2020 |
| WO | 2014069890 A1 | 5/2014 |
| WO | 2017140342 A1 | 8/2017 |
| WO | 2019064274 A1 | 4/2019 |
| WO | 2019153766 A1 | 8/2019 |

OTHER PUBLICATIONS

3GPP TS 38.331 V15.6.0; 3rd Generation Partnership Project; Technical Specification Group Radio Access Network; NR; Radio Resource Control (RRC) protocol specification (Release 15); Jun. 2019; consisting of 519 pages.

Japanese Office Action and English summary dated Sep. 19, 2023 for Application No. 2022-558151 consisting of 6 pages.

3GPP TSG-RAN WG2 Meeting #97bis R2-1702843; Title: Consideration on the NW slice in RAN; Agenda item: 10.2.4.2; Source: ZTE, ZTE Microelectronics; Document for: Discussion and Decision; Location and Date: Spokane, USA, Apr. 3-7, 2017, consisting of 3 pages.

3GPP TSG-RAN WG2 Meeting #97bis R2-1702915; Title: NR access control; Agenda Item: 10.4.1.6; Source: Samsung; Document for: Discussion; Location and Date: Spokane, USA, Apr. 3-7, 2017, consisting of 2 pages.

3GPP TSG-RAN WG2 NR Ad hoc 0118 R2-1800131; Revision of R2-1712410; Title: Cell Reselection Based on Slice Availability; Source: CATT; Agenda Item: 10.2.11; Document for: Discussion and Decision; Location and Date: Vancouver, Canada, Jan. 22-Jan. 26, 2018, consisting of 4 pages.

Chinese Office Action and English Translation dated Feb. 13, 2025 for Application No. 2021800258026, consisting of 16 pages.

3GPP TSG-RAN2 Meeting #103 R2-1811345; Title: Cell reselection priorities for NR frequency; Source to WG: OPPO; Source to TSG: R2; Work item code: NR_newRAT-Core; Release: Rel-15; Location and Date: Gothenburg, Sweden, Aug. 20-24, 2018; consisting of 57 pages.

3GPP TSG-RAN WG2 Meeting #101 R2-1801826; revision R2-1800131; Title: Cell Reselection Based on Slice Availability; Source: CATT; Agenda Item: 10.2.11; Document for: Discussion and Decision; Location and Date: Athens, Greece, Feb. 26-Mar. 2, 2018, consisting of 3 pages.

3GPP TSG-RAN WG2#99 R2-1709331; Title: Cell Reselection Based on Slice Information; Agenda item: 10.2.12; Source: Spreadtrum Communications; Document for: Discussion and Decision; Location and Date: Berlin, Germany, Aug. 21-25, 2017, consisting of 3 pages.

3GPP TSG-RAN WG2 Meeting #97bis R2- 1703595; Title: Mobility state estimation in NR; Agenda item: 10.4.2.4; Source: LG Electronics Inc.; Document for: Discussion; Location and Date: Spokane, USA, Apr. 3-7, 2017, consisting of 2 pages.

3GPP TS 36.331 V15.9.0; 3rd Generation Partnership Project; Technical Specification Group Radio Access Network; Evolved Universal Terrestrial Radio Access (E-UTRA); Radio Resource Control (RRC); Protocol specification (Release 15), Mar. 2020, consisting of 964 pages.

3GPP TSG-RAN WG2 NR #99 Meeting R2-1708083; (Resubmission of R2-1706421); Title: Idle mobility aspects to support network slicing; Agenda item: 10.2.12; Source: Samsung; Document for: Discussion & Decision; Location and Date: Berlin, Germany, Aug. 21-25, 2017, consisting of 4 pages.

* cited by examiner

METHOD FOR NETWORK-GUIDED WD CELL RESELECTION

CROSS-REFERENCE TO RELATED APPLICATIONS

This application is a Submission Under 35 U.S.C. § 371 for U.S. National Stage Patent Application of International Application No.: PCT/SE2021/050290, filed Mar. 31, 2021 entitled "METHOD FOR NETWORK-GUIDED WD CELL RESELECTION," which claims priority to U.S. Provisional Application No. 63/002,804, filed Mar. 31, 2020, entitled "METHOD FOR NETWORK-GUIDED WD CELL RESELECTION," the entireties of both of which are incorporated herein by reference.

FIELD

The present disclosure relates to wireless communications, and in particular, to network guided wireless device (WD) cell reselection.

BACKGROUND

IDLE Mode and INACTIVE Mode Mobility

In wireless communication systems that are standardized by the Third Generation Partnership Project (3GPP) systems, such as New Radio (NR) (also known as "5G") and Long Term Evolution (LTE), when a WD is in IDLE mode and/or INACTIVE mode, the WD is still associated with a cell, even though not actively communicating with that cell. The WD is said to be "camping" on the cell.

As the WD moves around, the WD may need to change which cell it is camping on. Such mobility is controlled by the network nodes using thresholds and priorities which the network nodes provide to the WD. The network nodes can provide such thresholds and priorities, hereinafter referred to as parameters, to the WD. These parameters might indicate, for example, how much better another cell must be than the current cell in order for the WD to move to that other cell. Also, the network node provides priorities to the WD which indicate, for example, which frequency the WD shall prefer to be camping on.

The network node can provide parameters to the WD via broadcast signaling or by dedicated signaling. The WD applies the broadcast parameters, unless the WD has been provided with dedicated priorities, or in other words: the WD may prioritize dedicated signaling over broadcast signaling.

One motivation for dedicated signaling is that the network, via network nodes, can load balance; the network can influence how many WDs prioritize a certain frequency, hence, distributing the WDs among different cells. Note that even though the WD is not generating any traffic when the WD is in IDLE/INACTIVE mode, the WDs will cause a load when the WD requests access to enter CONNECTED mode. So, if all WDs camp on the same cell carrier or frequency, they would all end up connecting to that cell when they eventually enter CONNECTED mode. This may cause an overload situation. Hence the network can make sure, using dedicated priorities, that some WDs camp on a first frequency, while other WDs camp on another frequency.

Some features may only be supported by certain cells, e.g., network nodes, in the network. 3GPP studies have considered that certain network slices are only supported on certain frequencies, or at least, that operators may prefer traffic associated with a certain slice on a certain frequency. For example, suppose an operator in a certain region wants to offer connectivity to a certain slice S1 only on frequency F1, whereas services on another slice S2 can be served on any frequency or on frequency F2. This situation may not be homogeneous throughout the network, so in one area it may be as described, whereas in another area, e.g., indoor, an operator may have different preferences and may want to serve slice S2 preferably with another frequency, e.g., F3. Currently, there is no easy way of signaling to the WD that dedicated priorities can change throughout a core network (CN) registration area. Nor is there any way of signaling to the WD that different slices may be associated with different frequency priorities. For example, if a WD is registered to two different slices and these two different slices are such that the operator prefers them to be served on different frequencies, there is currently no way of signaling this to the WD.

SUMMARY

There is a need for a solution that can provide information to the WD such that idle or inactive mode mobility (cell selection and reselection) can be done in such a way that a WD follows frequency priorities that are valid for certain specific cells, areas and slices.

Some embodiments advantageously provide methods, network nodes and wireless devices for network guided wireless device (WD) cell reselection.

A method in a WD for receiving and maintaining IDLE/INACTIVE mode mobility parameters is provided, where the WD may be:
  receiving at least one set of broadcasted parameters (e.g., priorities) for IDLE/INACTIVE mode mobility;
  receiving an indication from the network indicating which set of parameters the WD shall apply, depending on which slice the WD is registered to or has priority quick access to;
  determining based on the indication which parameter sets to apply, based on the registered slices; and/or
  applying one set of parameters for a particular slice and another set of parameters for another slice.

A method in a network node for maintaining IDLE/INACTIVE mode mobility parameters is provided, where the network may be:
  broadcasting multiple sets of parameters for IDLE/INACTIVE mode mobility parameters, where the broadcasted sets are associated with different WD classes or slices;
  determine which set of the broadcasted parameters the WD shall apply; and/or
  sending to a WD an indication of which of the set of parameters the WD is to apply, by either assigning a WD to a certain class or to directly signal that access to a certain slice should be associated with a certain set of parameters.

The certain set of parameters are typically frequency priorities that are associated with a specific WD class or a specific slice.

According to one aspect, a network node configured to communicate with a plurality of wireless devices (WD) is provided. The network node includes processing circuitry configured to select an index indicating a set of parameters of a plurality of sets of parameters, a set of parameters including at least one priority, the selecting being based at least in part on one of a registered slice and a service, the index usable to configure at least one WD of a first group of WDs to select a frequency priority based at least in part on the selected index. The network node includes a radio interface in communication with the processing circuitry, the radio interface configured to transmit the selected index to the at least one WD of the first group of WDs.

According to this aspect, in some embodiments, the radio interface is further configured to broadcast the plurality of sets of parameters to multiple wireless devices. In some embodiments, the radio interface is configured to unicast the plurality of sets of parameters to a particular one of the at least one WD of the first group of WDs. In some embodiments, each set of parameters of the plurality of sets of parameters corresponds to a different one of a registered slice or a service. In some embodiments, one set of parameters of the plurality of sets of parameters is a default set of parameters. In some embodiments, the processing circuitry is further configured to select multiple indices, each index of the multiple indices indicating a different set of parameters of the plurality of sets of parameters; and the radio interface is further configured to transmit the selected multiple indices to the at least one WD of the first group of WDs. In some embodiments, a priority in a set of parameters directs the at least one WD of the first group of WDs to prioritize one slice or service over another slice or service. In some embodiments, the selecting is further based on a capability of the at least one WD of the first group of WDs. In some embodiments, the selecting is further based on a mobility state of a particular one of the at least one WD of the first group of WDs. In some embodiments, the processing circuitry is further configured to select multiple indices, each index of the multiple indices indicating a different set of parameters of the plurality of sets of parameters; and the radio interface is further configured to transmit each selected one of the multiple indices to a different group of WDs.

According to another aspect, a method in a network node configured to communicate with a plurality of wireless devices (WD) is provided. The method includes selecting an index indicating a set of parameters of a plurality of sets of parameters, a set of parameters including at least one priority, the selecting being based at least in part on one of a registered slice and a service, the index usable to configure at least one WD of a first group of WDs to select a frequency priority based at least in part on the selected index; and transmitting the selected index to the at least one WD of the first group of WDs.

According to this aspect, in some embodiments, the method also includes broadcasting the plurality of sets of parameters to multiple wireless devices. In some embodiments, the method includes unicasting the plurality of sets of parameters to a particular one of the at least one WD of the first group of WDs. In some embodiments, each set of parameters of the plurality of sets of parameters corresponds to a different one of a registered slice or a service. In some embodiments, one set of parameters of the plurality of sets of parameters is a default set of parameters. In some embodiments, the method includes selecting multiple indices, each index of the multiple indices indicating a different set of parameters of the plurality of sets of parameters; and transmitting the selected multiple indices to the at least one WD of the first group of WDs. In some embodiments, a priority in a set of parameters directs the at least one WD of the first group of WDs to prioritize one slice or service over another slice or service. In some embodiments, the selecting is further based on a capability of the at least one WD of the first group of WDs. In some embodiments, the selecting is further based on a mobility state of a particular one of the at least one WD of the first group of WDs. In some embodiments, the method includes selecting multiple indices, each index of the multiple indices indicating a different set of parameters of the plurality of sets of parameters; and transmitting each selected one of the multiple indices to a different group of WDs.

According to yet another aspect, a WD is configured to communicate with a network node. The WD includes processing circuitry configured to: obtain an indication of a set of parameters of a plurality of sets of parameters, a set of parameters including at least one index and at least one frequency priority; and select a frequency priority from the set of parameters indicated by the obtained indication, the obtained indication corresponding to a prioritized slice.

According to this aspect, in some embodiments, the indication is obtained from the network node. In some embodiments, when no indication is obtained from the network node, the indication is one of a default indication and a random indication obtained from a memory of the WD. In some embodiments, the processing circuitry is further configured to register the WD to the corresponding prioritized slice. In some embodiments, the processing circuitry is further configured to access a cell according to the selected frequency priority when reinitiating communication associated with the corresponding prioritized slice. In some embodiments, the processing circuitry is further configured to: obtain multiple indices, each index of the multiple indices indicating a different set of parameters of the plurality of sets of parameters, and select a set of parameters among the sets of parameters indicated by the multiple indices, the selecting being based at least in part on a comparison of frequency priorities of different sets of parameters indicated by the multiple indices. In some embodiments, the processing circuitry is further configured to discard, ignore or deem as invalid, the obtained indication upon an occurrence of at least one of: the WD lacking a capability for the prioritized slice; a timer expiring; the indicated set of parameters being unavailable at the WD; the WD changing to an IDLE state; the WD changing a mobility state; and the WD deregistering from the prioritized slice. In some embodiments, the WD further includes a radio interface configured to receive the obtained indication from the network node on a broadcast channel. In some embodiments, the WD further includes a radio interface configured to receive the plurality of sets of parameters from the network node. In some embodiments, the obtained indication is received from the network node in an RRCRelease message usable to move the WD from one state to another state.

According to another embodiments, a method in a wireless device includes: obtaining an indication of a set of parameters of a plurality of sets of parameters, a set of parameters including at least one index and at least one frequency priority; and selecting a frequency priority from the set of parameters indicated by the obtained indication, the obtained indication corresponding to a prioritized slice.

According to this aspect, in some embodiments, the indication is obtained from the network node. In some embodiments, when no indication is obtained from the network node, the indication is one of a default indication and a random indication obtained from a memory of the WD. In some embodiments, the method also includes registering the WD to the corresponding prioritized slice. In some embodiments, the method also includes accessing a cell according to the selected frequency priority when reinitiating communication associated with the corresponding prioritized slice. In some embodiments, the method further includes obtaining multiple indices, each index of the multiple indices indicating a different set of parameters of the plurality of sets of parameters, and selecting a set of parameters among the sets of parameters indicated by the multiple indices, the selecting being based at least in part on a comparison of frequency priorities of different sets of parameters indicated by the multiple indices. According to this aspect, in some embodiments, the method also includes discarding, ignoring or deeming as invalid, the obtained indication upon an occurrence of at least one of: the WD lacking a capability for the prioritized slice; a timer expiring; the indicated set of parameters being unavailable at the WD; the WD changing to an IDLE state; the WD changing a mobility state; and the WD deregistering from the prioritized slice. In some embodiments, the method also includes receiving the obtained indication from the network node on a broadcast channel. In some embodiments, the method also includes receiving the plurality of sets of parameters from the network node. In some embodiments, the obtained indication is received from the network node in an RRCRelease message usable to move the WD from one state to another state.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
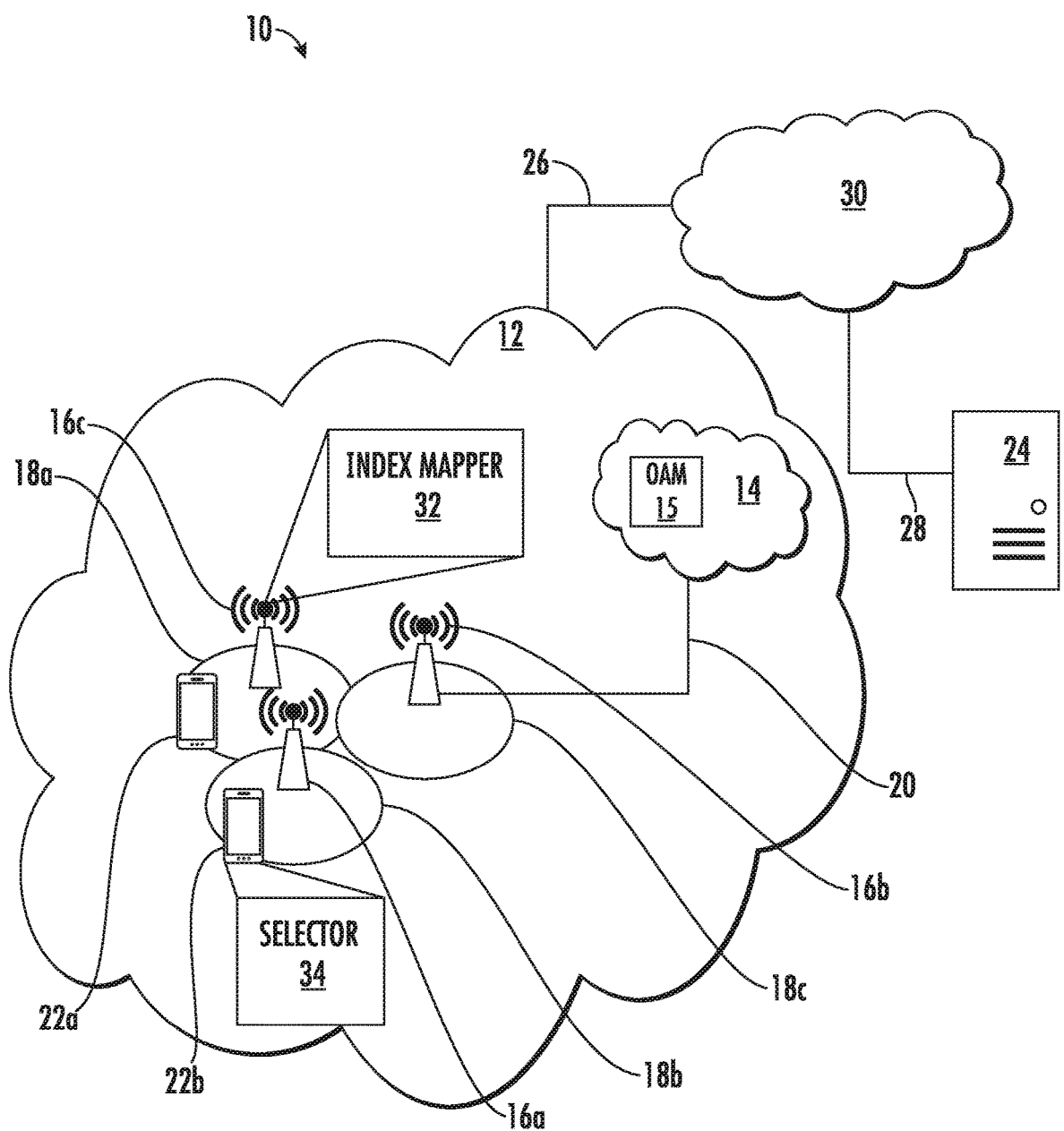
FIG. 1 is a schematic diagram of an exemplary network architecture illustrating a communication system connected via an intermediate network to a host computer according to the principles in the present disclosure.

Before describing in detail exemplary embodiments, it is noted that the embodiments reside primarily in combinations of apparatus components and processing steps related to network guided wireless device (WD) cell reselection. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

As used herein, the term "legacy signaling", "legacy fields" and similar terms refers to signaling and fields which are defined in an existing version of a specification. For example, if a field is defined in a version 16 of the New Radio/Long Term Evolution (NR/LTE) specifications, then a field which is defined in 3GPP Release 15 (Rel-15) of those specifications would be considered a legacy field and signaling using this field would be considered legacy signaling.

Embodiments provide network guided wireless device (WD) cell reselection. According to one aspect, a network broadcasts multiple sets of parameters for WDs to use when performing mobility among cells when the WDs are in IDLE mode and/or INACTIVE mode. In current NR/LTE specifications, the network sends a single set of such parameters as described above. These parameters include priorities. A WD which is in IDLE mode or INACTIVE mode applies these priorities to determine on which cell and/or frequency the WD is to camp. However, in embodiments described below, the network node would provide multiple sets of parameters and an indication used by the WD to select and apply a particular one of the sets of parameters depending on certain conditions as explained below.

The solution enables specific WD groups to be associated with an "identity", e.g., a class or a slice association and with this classification or association be able to control what different frequency priority indications the WD is using for different slices in different parts of the network. Thus, different groups of WDs may be configured to apply different parameters for IDLE/INACTIVE mode mobility. In other words, different parameters may be applied to different groups of WDs based on different criteria determined by the network. In particular, a WD may not necessarily be of a certain category, or a certain type, but it may temporarily be registered to a certain slice and from that registration, the WD may associate different parameter sets to certain slices and to the WD's idle mode mobility procedure.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The core network node 14 may have an operations, administration and maintenance (OAM) node 15. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 may be configured to include an index mapper 32 which is configured to map an index to a set of parameters of a plurality of sets of parameters, the parameters in a set including at least one priority used to configure the WD to select one of a network slice, frequency and service. The network node 16 may be configured to select an index indicating a set of parameters of that include at least one priority, the selecting being based at least in part on one of a registered slice and a service. A wireless device 22 may be configured to include a selector 34 which is configured to select a set of cell reselection parameters associated with a network slice or service based on the registered slices. The WD 22 may be configured to select a frequency priority from the set of parameters indicated by the obtained indication, the obtained indication corresponding to a prioritized slice.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include index mapper 32 which is configured to map an index to a set of parameters of a plurality of sets of parameters, the parameters in a set including at least one priority used to configure the WD to select one of a network slice, frequency and service. The processing circuitry may be configured to select an index indicating a set of parameters of that include at least one priority, the selecting being based at least in part on one of a registered slice and a service.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include selector 34 which is configured to select one of a network slice, frequency and service, based at least in part on a priority included in the set of parameters. The processing circuitry 84 may be configured to select a frequency priority from the set of parameters indicated by the obtained indication, the obtained indication corresponding to a prioritized slice.

Figure 2:
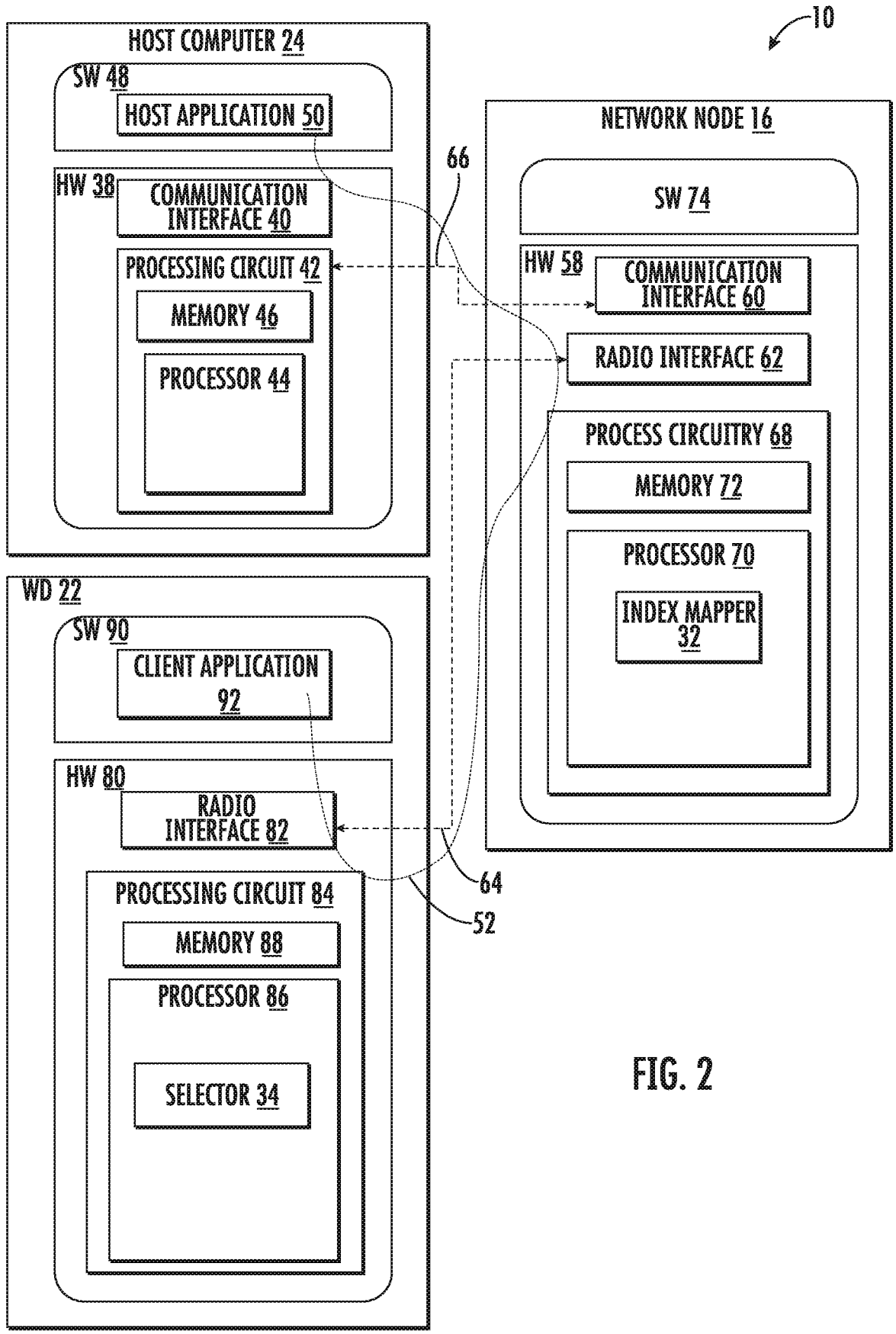
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as index mapper 32 and selector 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
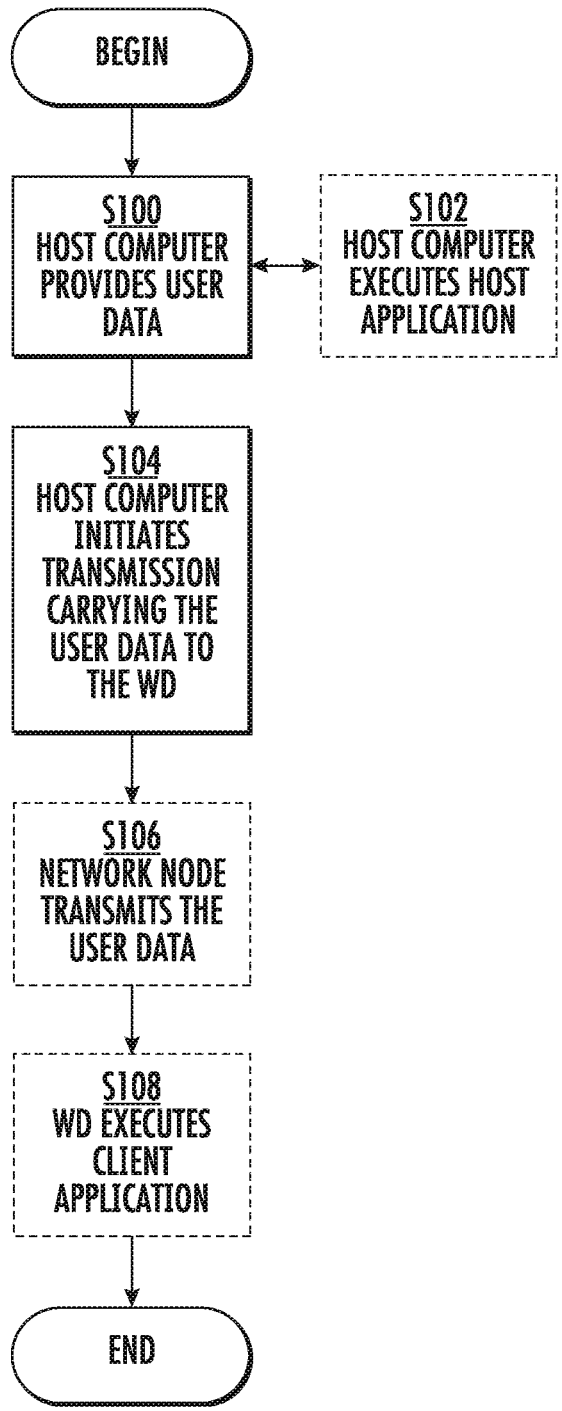
FIG. 3 is a flowchart illustrating exemplary methods implemented in a communication system including a host computer, a network node and a wireless device for executing a client application at a wireless device according to some embodiments of the present disclosure.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

Figure 4:
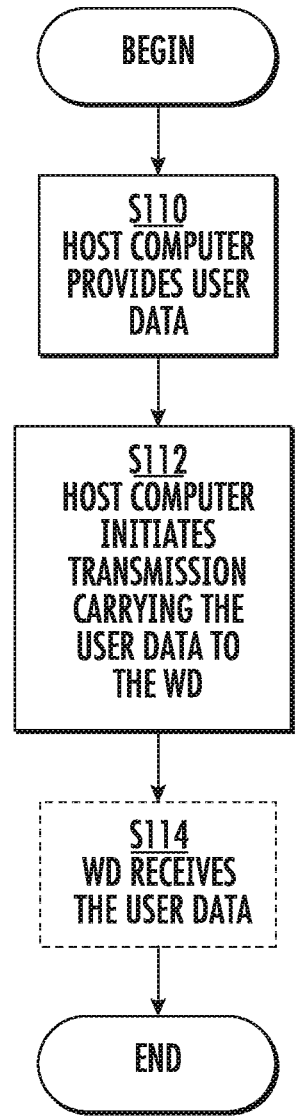
FIG. 4 is a flowchart illustrating exemplary methods implemented in a communication system including a host computer, a network node and a wireless device for receiving user data at a wireless device according to some embodiments of the present disclosure.

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 5:
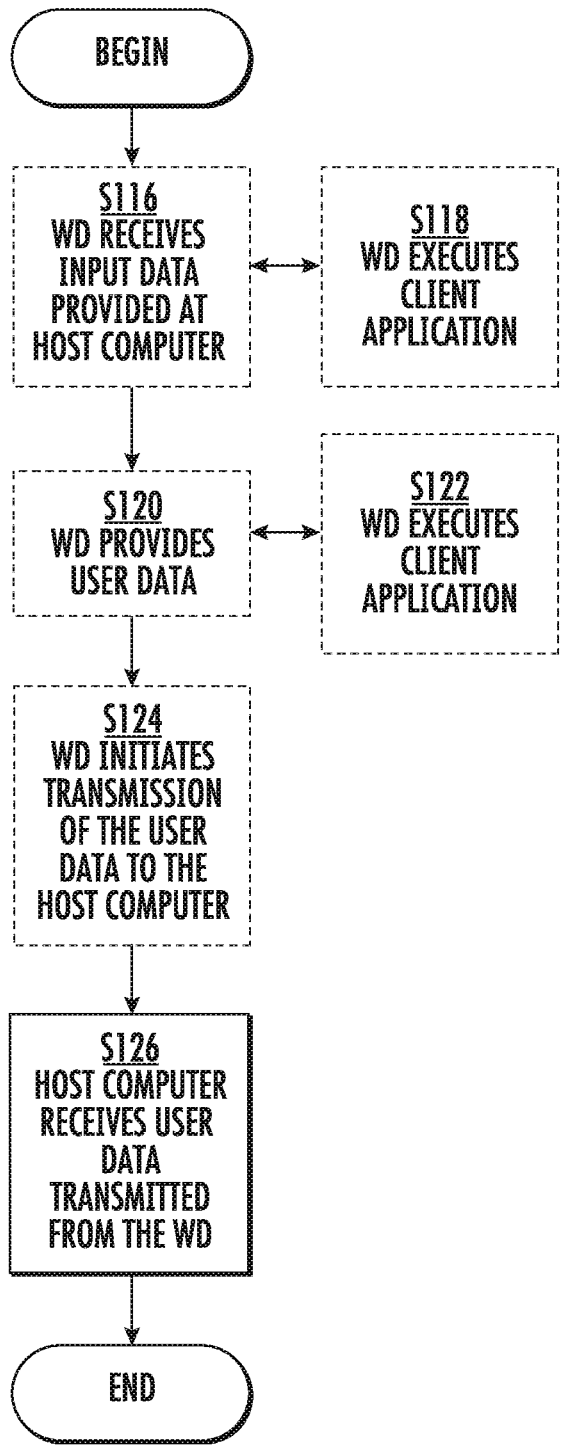
FIG. 5 is a flowchart illustrating exemplary methods implemented in a communication system including a host computer, a network node and a wireless device for receiving user data from the wireless device at a host computer according to some embodiments of the present disclosure.

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 6:
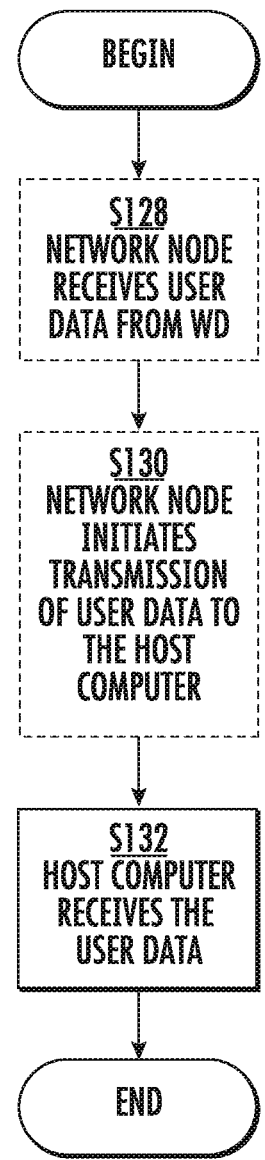
FIG. 6 is a flowchart illustrating exemplary methods implemented in a communication system including a host computer, a network node and a wireless device for receiving user data at a host computer according to some embodiments of the present disclosure.

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
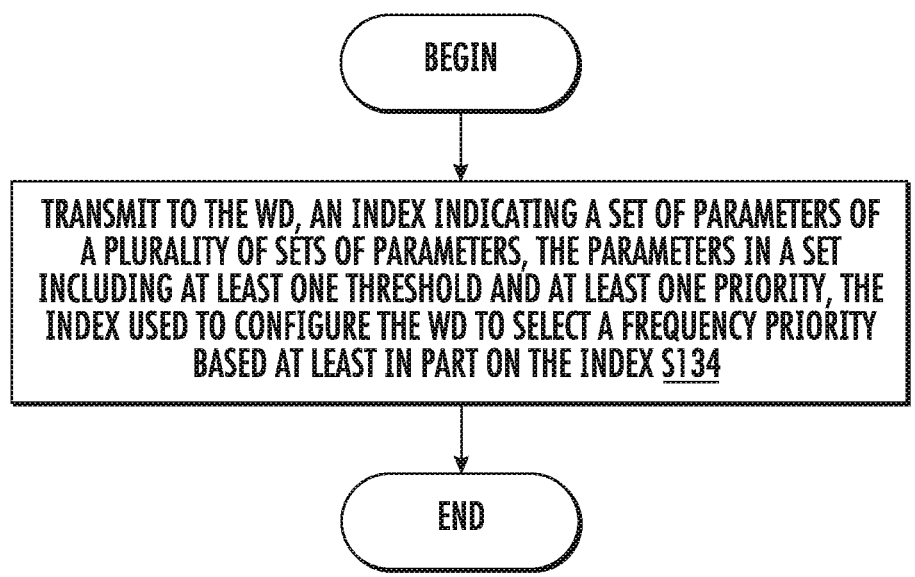
FIG. 7 is a flowchart of an exemplary process in a network node for network guided wireless device (WD) cell reselection.

FIG. 7 is a flowchart of an exemplary process in a network node 16 for network guided wireless device (WD) cell reselection. One or more blocks described herein may be performed by one or more elements of network node 16 such as by one or more of processing circuitry 68 (including the index mapper 32), processor 70, radio interface 62 and/or communication interface 60. Network node 16 such as via processing circuitry 68 and/or processor 70 and/or radio interface 62 and/or communication interface 60 is configured to transmit to the WD, an index indicating a set of parameters of a plurality of sets of parameters, the parameters in a set including at least one priority, the index used to configure the WD to select a frequency priority based at least in part on the index (Block S134).

Figure 8:
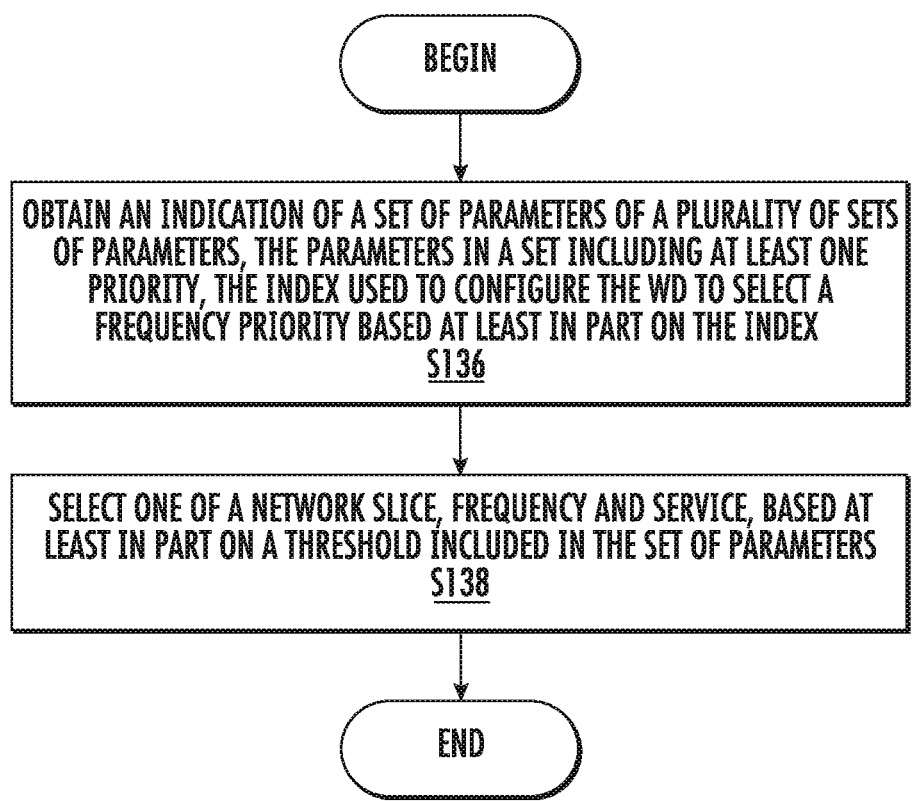
FIG. 8 is a flowchart of an exemplary process in a wireless device for network guided wireless device (WD) cell reselection.

FIG. 8 is a flowchart of an exemplary process in a wireless device 22 according to some embodiments of the present disclosure. One or more blocks described herein may be performed by one or more elements of wireless device 22 such as by one or more of processing circuitry 84 (including the selector 34), processor 86, radio interface 82 and/or communication interface 60. Wireless device 22 such as via processing circuitry 84 and/or processor 86 and/or radio interface 82 is configured to obtain an indication of a set of parameters of a plurality of sets of parameters, the parameters in a set including at least one priority, the index used to configure the WD to select a frequency priority based at least in part on the index (Block S136). The process also includes selecting one of a network slice, frequency and service, based at least in part on a threshold included in the set of parameters (Block S138).

Figure 9:
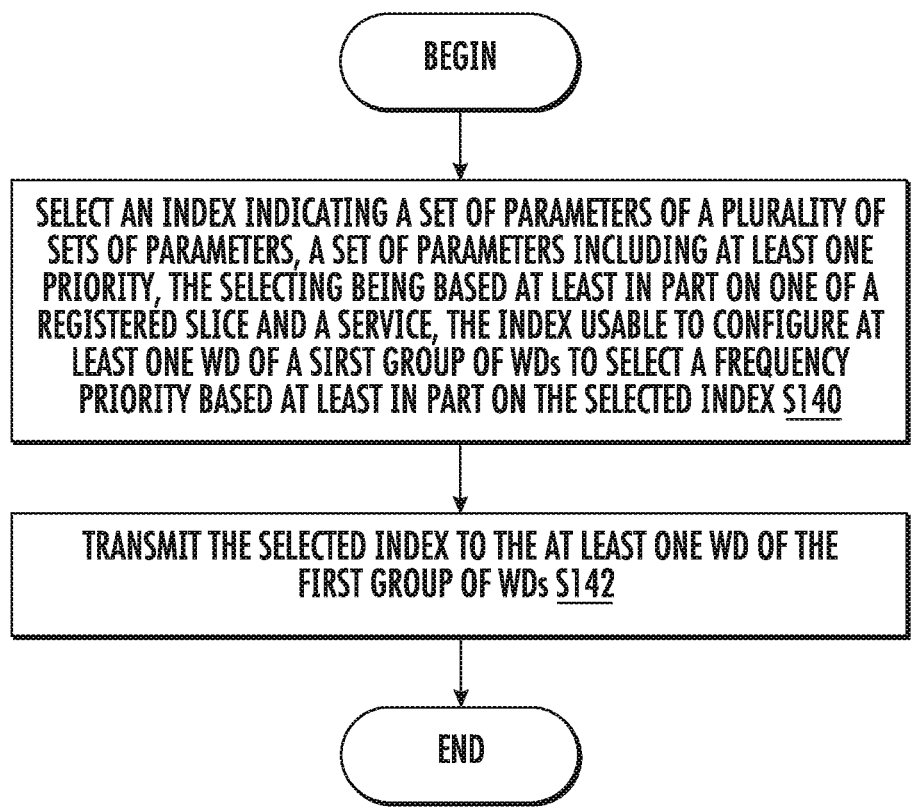
FIG. 9 is a flowchart of another example process in a network node for network guided WD cell reselection.

FIG. 9 is a flowchart of another example process for network guided WD cell reselection. One or more blocks described herein may be performed by one or more elements of network node 16 such as by one or more of processing circuitry 68 (including the index mapper 32), processor 70, radio interface 62 and/or communication interface 60. Network node 16 such as via processing circuitry 68 and/or processor 70 and/or radio interface 62 and/or communication interface 60 is configured to select an index indicating a set of parameters of a plurality of sets of parameters, a set of parameters including at least one priority, the selecting being based at least in part on one of a registered slice and a service, the index usable to configure at least one WD of a first group of WDs to select a frequency priority based at least in part on the selected index (Block S140). The process also includes transmitting the selected index to the at least one WD of the first group of WDs (Block S142).

Figure 10:
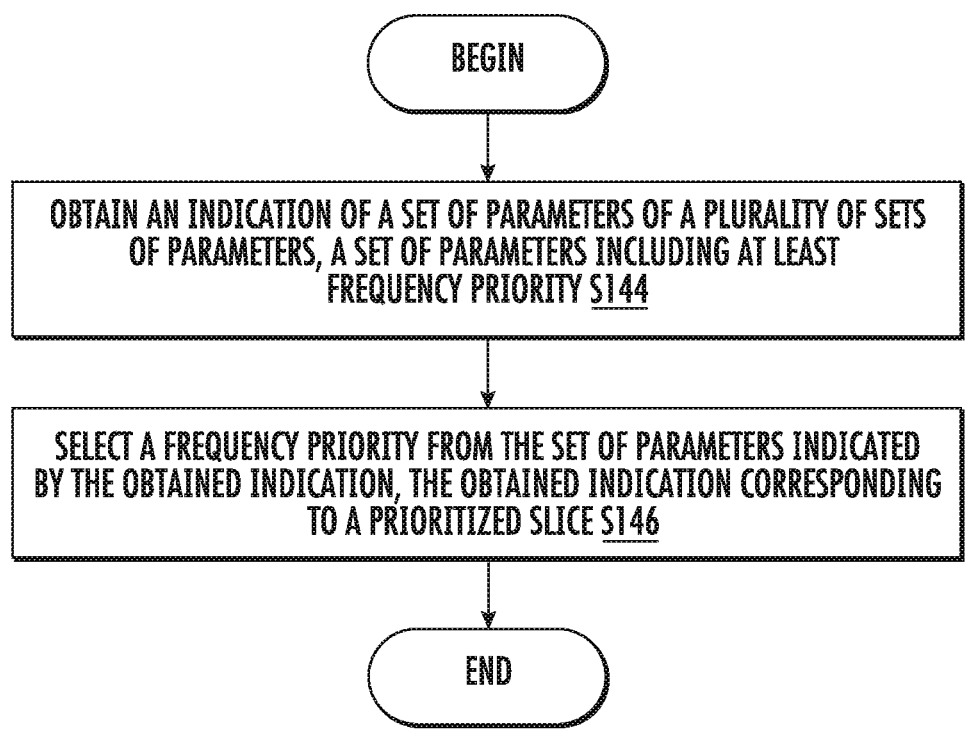
FIG. 10 is a flowchart of another example process in a WD for network guided WD cell reselection.

FIG. 10 is a flowchart of another example process in a WD for network guided WD cell reselection. One or more blocks described herein may be performed by one or more elements of wireless device 22 such as by one or more of processing circuitry 84 (including the selector 34), processor 86, radio interface 82 and/or communication interface 60. Wireless device 22 such as via processing circuitry 84 and/or processor 86 and/or radio interface 82 is configured to obtain an indication of a set of parameters of a plurality of sets of parameters, a set of parameters including at least one index and at least one frequency priority (Block S144). The process further includes selecting a frequency priority from the set of parameters indicated by the obtained indication, the obtained indication corresponding to a prioritized slice (Block S146)

Having described the general process flow of arrangements of the disclosure and having provided examples of hardware and software arrangements for implementing the processes and functions of the disclosure, the sections below provide details and examples of arrangements for network guided wireless device (WD) cell reselection.

As mentioned above, the network node 16 may configure the WD 22 with multiple sets of parameters, and may subsequently indicate a particular set to be applied by the WD 22. Different sets of parameters may be identified by a certain identifier (in the example ASN.1 implementation, this is provided as WDCategoryIndex). For example, an index which may be an integer value may be signaled by the network node 16 to the WD 22. Different sets of parameters may be identified by a new field or an existing field.

If the signaling supports multiple additional (i.e., in addition to the legacy/known parameters) sets of parameters, the additional sets may be provided in a list. In this case, an explicit identifier may not be assigned to the to the sets in the list. Instead, a set may be indicated implicitly based on where in the list the set appears. For example, the first set in the list may be associated with an index 1 (or 2), the second with an index 2 (or 3), and so on. For example, parameters in existing fields may be associated with an index 0 (or 1).

One set of parameters may be considered to be a default set of parameters. The default parameters may be those parameters sent in existing signaling.

Below is an example showing how multiple sets can be implemented in 3GPP Technical Standard (TS) 38.331 v15.6.0. The changes to existing code are shown with underlined, bold text. Some irrelevant parts of existing code are omitted. A similar set of changes is applicable for system information block 4 (SIB4), inter-frequency reselection parameters and SIB5, and inter-radio access technology (RAT) reselection parameters.

Example with Explicit Indication of WDCategoryType
SIB2
SIB2 contains cell re-selection information common for intra-frequency, inter-frequency and/or inter-RAT cell re-selection, (i.e., applicable for more than one type of cell re-selection but not necessarily all) as well as intra-frequency cell re-selection information other than neighboring cell related information.

SIB2 information element

```
-- ASN1START
-- TAG-SIB2-START
SIB2 ::=                          SEQUENCE {
   cellReselectionInfoCommon              SEQUENCE {
      nrofSS-BlocksToAverage                   INTEGER (2..maxNrofSS-BlocksToAverage)
OPTIONAL,   -- Need S
      absThreshSS-BlocksConsolidation          ThresholdNR                    OPTIONAL,
-- Need S
      rangeToBestCell                    RangeToBestCell              OPTIONAL,  --
Need R
      q-Hyst                        ENUMERATED {
                                 dB0, dB1, dB2, dB3, dB4, dB5, dB6, dB8, dB10,
                                 dB12, dB14, dB16, dB18, dB20, dB22, dB24},
      speedStateReselectionPars               SEQUENCE {
         mobilityStateParameters                  MobilityStateParameters,
```

-continued

| SIB2 information element | | |
|---|---|---|
| q-HystSF | SEQUENCE { | |
|     sf-Medium |     ENUMERATED {dB-6, dB-4, dB-2, dB0}, | |
|     sf-High |     ENUMERATED {dB-6, dB-4, dB-2, dB0} | |
|     } | | |
| } | | OPTIONAL,  -- Need R |
| ... | | |
| }, | | |
| cellReselectionServingFreqInfo | SEQUENCE { | |
|     s-NonIntraSearchP | ReselectionThreshold | OPTIONAL, -- Need S |
|     s-NonIntraSearchQ | ReselectionThresholdQ | OPTIONAL, -- Need S |
|     threshServingLowP | ReselectionThreshold, | |
|     threshServingLowQ | ReselectionThresholdQ | OPTIONAL, -- Need R |
|     cellReselectionPriority | CellReselectionPriority, | |
|     cellReselectionSubPriority | CellReselectionSubPriority | OPTIONAL, -- Need R |
|     ... | | |
| }, | | |
| intraFreqCellReselectionInfo | SEQUENCE { | |
|     q-RxLevMin | Q-RxLevMin, | |
|     q-RxLevMinSUL | Q-RxLevMin | OPTIONAL, -- Need R |
|     q-QualMin | Q-QualMin | OPTIONAL, -- Need S |
|     s-IntraSearchP | ReselectionThreshold, | |
|     s-IntraSearchQ | ReselectionThresholdQ | OPTIONAL, -- Need S |
|     t-ReselectionNR | T-Reselection, | |
|     frequencyBandList | MultiFrequencyBandListNR-SIB | OPTIONAL, -- Need S |
|     frequencyBandListSUL | MultiFrequencyBandListNR-SIB | OPTIONAL, -- Need R |
|     p-Max | P-Max | OPTIONAL, -- Need R |
|     smtc | SSB-MTC | OPTIONAL, -- Need R |
|     ss-RSSI-Measurement | SS-RSSI-Measurement | OPTIONAL, -- Need R |
|     ssb-ToMeasure | SSB-ToMeasure | OPTIONAL, -- Need R |
|     deriveSSB-IndexFromCell | BOOLEAN, | |
|     ..., | | |
|     [[ | | |
|     t-ReselectionNR-SF | SpeedStateScaleFactors | OPTIONAL -- Need N |
|     ]] | | |
| }, | | |
| ...<u>,</u> | | |
| <u>[[ cellReselectionPriorityList-r16</u> | <u>CellReselectionPriorityList-r16 OPTIONAL --</u> | |
| <u>Need N</u> | | |
| <u>]]</u> | | |
| } | | |
| RangeToBestCell ::= Q-OffsetRange | | |
| <u>CellReselectionPriorityList-r16 ::= SEQUENCE (SIZE (1..maxNrofUETypes)) OF</u> | | |
| <u>CellReselectionPriorities</u> | | |
| <u>CellReselectionPriorities    ::= SEQUENCE {</u> | | |
| <u>    ueCategoryIndex</u> | <u>INTEGER (1..</u> | |
| <u>maxNrofUETypes),</u> | | |
|     <u>cellReselectionPriority</u> | <u>CellReselectionPriority,</u> | |
|     <u>cellReselectionSubPriority</u> | <u>CellReselectionSubPriority    OPTIONAL</u> -- | |
| <u>Need R</u> | | |
| <u>}</u> | | |
| -- TAG-SIB2-STOP | | |
| -- ASN1STOP | | |
| End of example | | |

As an extension to the above, in one embodiment, the network does not broadcast WDCategoryIndex, but rather, associates CellReselectionPriority indications with different slices or services. Thus, instead of considering the type of WD 22 and WD 22 capabilities, the frequency priority that is valid for a WD 22 at a certain point in time is steered by what slice a WD 22 is registered to, or alternatively, what service a WD 22 wants to utilize.

An example of such a broadcast is provided below:

| SIB2 information element |
| --- |
| ```
-- ASN1START
-- TAG-SIB2-START
SIB2 ::=                            SEQUENCE {
    cellReselectionInfoCommon           SEQUENCE {
        nrofSS-BlocksToAverage              INTEGER (2..maxNrofSS-BlocksToAverage)       OPTIONAL,  -- Need S
        absThreshSS-BlocksConsolidation     ThresholdNR                                  OPTIONAL,  -- Need S
        rangeToBestCell                     RangeToBestCell                              OPTIONAL,  -- Need R
        q-Hyst                              ENUMERATED {
                                                dB0, dB1, dB2, dB3, dB4, dB5, dB6, dB8, dB10,
                                                dB12, dB14, dB16, dB18, dB20, dB22, dB24},
        speedStateReselectionPars           SEQUENCE {
            mobilityStateParameters             MobilityStateParameters,
            q-HystSF                            SEQUENCE {
                sf-Medium                           ENUMERATED {dB-6, dB-4, dB-2, dB0},
                sf-High                             ENUMERATED {dB-6, dB-4, dB-2, dB0}
            }
        }                                                                                OPTIONAL,  -- Need R
        ...
    },
    cellReselectionServingFreqInfo      SEQUENCE {
        s-NonIntraSearchP                   ReselectionThreshold                         OPTIONAL,  -- Need S
        s-NonIntraSearchQ                   ReselectionThresholdQ                        OPTIONAL,  -- Need S
        threshServingLowP                   ReselectionThreshold,
        threshServingLowQ                   ReselectionThresholdQ                        OPTIONAL,  -- Need R
        cellReselectionPriority             CellReselectionPriority,
        cellReselectionSubPriority          CellReselectionSubPriority                   OPTIONAL,  -- Need R
        ...
    },
    intraFreqCellReselectionInfo        SEQUENCE {
        q-RxLevMin                          Q-RxLevMin,
        q-RxLevMinSUL                       Q-RxLevMin                                   OPTIONAL,  -- Need R
        q-QualMin                           Q-QualMin                                    OPTIONAL,  -- Need S
        s-IntraSearchP                      ReselectionThreshold,
        s-IntraSearchQ                      ReselectionThresholdQ                        OPTIONAL,  -- Need S
        t-ReselectionNR                     T-Reselection,
        frequencyBandList                   MultiFrequencyBandListNR-SIB                 OPTIONAL,  -- Need S
        frequencyBandListSUL                MultiFrequencyBandListNR-SIB                 OPTIONAL,  -- Need R
        p-Max                               P-Max                                        OPTIONAL,  -- Need R
        smtc                                SSB-MTC                                      OPTIONAL,  -- Need R
        ss-RSSI-Measurement                 SS-RSSI-Measurement                          OPTIONAL,  -- Need R
        ssb-ToMeasure                       SSB-ToMeasure                                OPTIONAL,  -- Need R
        deriveSSB-IndexFromCell             BOOLEAN,
        ...,
        [[
        t-ReselectionNR-SF                  SpeedStateScaleFactors                       OPTIONAL   -- Need N
        ]]
    },
    ...,
    [[ cellReselectionPriorityList-r16    CellReselectionPriorityList-r16 OPTIONAL   -- Need N
    ]]
    }
    ]]
},
...
``` |

-continued

| SIB2 information element |
|---|
| ```
[[ cellReselectionPriorityList-r17    CellReselectionPriorityList-r17 OPTIONAL    --
Need N
]]
}
RangeToBestCell    ::= Q-OffsetRange
CellReselectionPriorityList-r16 ::=    SEQUENCE (SIZE (1..maxNrofUETypes)) OF
CellReselectionPriorities
CellReselectionPriorities       ::= SEQUENCE {
    ueCategoryIndex                            INTEGER (1..
maxNrofUETypes),
    cellReselectionPriority        CellReselectionPriority,
    cellReselectionSubPriority     CellReselectionSubPriority    OPTIONAL  --
Need R
}
CellReselectionPriorityList-r17 ::=    SEQUENCE (SIZE (1..maxNrofSlices)) OF
CellReselectionPriorities
CellReselectionPriorities       ::= SEQUENCE {
    SliceIndex                                 INTEGER (1.. maxNrofSlices),
    cellReselectionPriority        CellReselectionPriority,
    cellReselectionSubPriority     CellReselectionSubPriority    OPTIONAL  --
Need R
}
-- TAG-SIB2-STOP
-- ASN1STOP
``` |

Another alternative to an addition would be to add an index not to a slice, but to a service instead:

```
...
CellReselectionPriorityList-r17 ::=    SEQUENCE (SIZE (1..maxNrofServices)) OF
CellReselectionPriorities
CellReselectionPriorities       ::= SEQUENCE {
    ServiceIndex                               INTEGER (1..
maxNrofServices),
    cellReselectionPriority        CellReselectionPriority,
    cellReselectionSubPriority     CellReselectionSubPriority    OPTIONAL  --
Need R
}
...
```

Thus, with the coding set forth above, it is possible to broadcast different frequency priorities dependent on different services or different slices. A WD 22 can then, independent of WD 22 category, select a single frequency priority that is applicable for a specific service.

In some situations, the network, such as via network node 16, may broadcast both WD 22 category priorities, WD 22 slice priorities and WD 22 service priorities. In such situations, a WD 22 may determine if cellReselectionPriorities are different, and if so, which to follow. According to one aspect, the frequencyPriorities that relate to wireless device category or wireless device type have a highest priority. Priorities related to a slice may have a second highest priority and priorities related to service may have a third highest priority. In other exemplary embodiments, the service takes precedence.

WD Determines which Parameters Set to Apply

In some embodiments, the network node 16 configures a WD 22 to use a particular set, among multiple sets, of cell (re)selection parameters the WD 22 is to consider. This may be accomplished by sending from the network node 16 to the WD 22 a parameter set indication.

The parameter set indication may be indicated with dedicated signaling from the network to the WD 22. For example, the parameter set indication, signaled in a message which is used to move the WD 22 from CONNECTED mode to an IDLE/INACTIVE mode, such as an RRCRelease-message, may be used to send the parameter set indication.

Below is an example showing how such an indication can be implemented in 3GPP TS 38.331 v15.6.0. The change is shown with underlined and bold text. For this example, irrelevant parts of existing code are omitted.

Beginning of Example

RRCRelease

The RRCRelease message is used to command the release of an RRC connection or the suspension of the RRC connection.

| Signalling radio bearer: SRB1 |
|---|
| ```
RLC-SAP: AM
Logical channel: DCCH
Direction: Network to WD
RRCRelease message
-- ASN1START
-- TAG-RRCRELEASE-START
RRCRelease ::=               SEQUENCE {
    rrc-TransactionIdentifier         RRC-TransactionIdentifier,
    criticalExtensions                CHOICE {
        rrcRelease                    RRCRelease-IEs,
``` |

| Signalling radio bearer: SRB1 |  |
|---|---|
| criticalExtensionsFuture | SEQUENCE { } |
| }<br>}<br>RRCRelease-IEs ::=<br>  redirectedCarrierInfo<br>OPTIONAL, -- Need N<br>  cellReselectionPriorities<br>OPTIONAL, -- Need R<br>  suspendConfig<br>OPTIONAL, -- Need R<br>  deprioritisationReq<br>    deprioritisationType<br>    deprioritisationTimer<br>  }<br>N<br>  lateNonCriticalExtension<br>OPTIONAL,<br>  nonCriticalExtension<br>OPTIONAL<br>}<br>RRCRelease-v1540-IEs ::=<br>  waitTime<br>  nonCriticalExtension<br>}<br>RedirectedCarrierInfo ::=<br>  nr<br>  eutra<br>  ...,<br>    cellReselectionParameterSetIndex INTEGER (1.. maxNrofUETypes)<br>}<br>-- TAG-RRCRELEASE-STOP<br>-- ASN1STOP<br>End of example | SEQUENCE {<br>    RedirectedCarrierInfo<br><br>    CellReselectionPriorities<br><br>    SuspendConfig<br><br>    SEQUENCE {<br>        ENUMERATED {frequency, nr},<br>        ENUMERATED {min5, min10, min15, min30}<br>                OPTIONAL, -- Need<br><br>    OCTET STRING<br><br>    RRCRelease-v1540-IEs<br><br><br>    SEQUENCE {<br>RejectWaitTime    OPTIONAL, -- Need N<br>SEQUENCE { }    OPTIONAL<br><br>CHOICE {<br>CarrierInfoNR,<br>RedirectedCarrierInfo-EUTRA, |

In some embodiments, the cellReselectionParameterSetIndex can also be extended to include indications that point toward specific slices or services, as in the example below. In this example, in the RRCRelease message, the network indicates the cellReselectionParameterSetIndex associated to a given slice. The network could provide different cellReselectionParameterSetIndex for different slice as part of the cellReselectionSliceParameterSet list. The network could provide the same cellReselectionParameterSetIndex for more than one slice.

| RRCRelease message |  |
|---|---|
| -- ASN1START<br>-- TAG-RRCRELEASE-START<br>RRCRelease ::=<br>  rrc-TransactionIdentifier<br>  criticalExtensions<br>    rrcRelease<br>    criticalExtensionsFuture<br>  }<br>}<br>RRCRelease-IEs ::=<br>  redirectedCarrierInfo<br>OPTIONAL, -- Need N<br>  cellReselectionPriorities<br>OPTIONAL, -- Need R<br>  suspendConfig<br>OPTIONAL, -- Need R<br>  deprioritisationReq<br>    deprioritisationType<br>    deprioritisationTimer<br>  }<br>N<br>  lateNonCriticalExtension<br>OPTIONAL,<br>  nonCriticalExtension<br>OPTIONAL<br>}<br>RRCRelease-v1540-IEs ::=<br>  waitTime<br>  nonCriticalExtension<br>}<br>RedirectedCarrierInfo ::= | SEQUENCE {<br>    RRC-TransactionIdentifier,<br>    CHOICE {<br>    RRCRelease-IEs,<br>        SEQUENCE { }<br><br><br>SEQUENCE {<br>    RedirectedCarrierInfo<br><br>    CellReselectionPriorities<br><br>    SuspendConfig<br><br>    SEQUENCE {<br>        ENUMERATED {frequency, nr},<br>        ENUMERATED {min5, min10, min15, min30}<br>                OPTIONAL, -- Need<br><br>    OCTET STRING<br><br>    RRCRelease-v1540-IEs<br><br><br>    SEQUENCE {<br>RejectWaitTime    OPTIONAL, -- Need N<br>SEQUENCE { }    OPTIONAL<br><br>CHOICE { |

```
                         RRCRelease message
  nr                           CarrierInfoNR,
  eutra                        RedirectedCarrierInfo-EUTRA,
  ...,
    cellReselectionSliceParameterSet    CellReselectionSliceParameterSet
}
CellReselectionSliceParameterSet ::=    SEQUENCE (SIZE (1..maxNrOfSlices)) OF
SliceReselectionParameterSetIndex
SliceReselectionParameterSetIndex ::=   SEQUENCE {
  sliceIndex                   S-NSSAI,
  cellReselectionParameterSetIndex         INTEGER (0..maxNrOfSlices)
}
-- TAG-RRCRELEASE-STOP
-- ASN1STOP
End of example
Or alternatively:
RedirectedCarrierInfo ::=      CHOICE {
  nr                           CarrierInfoNR,
  eutra                        RedirectedCarrierInfo-EUTRA,
  ...,
    cellReselectionServiceParameterSet       CellReselectionServiceParameterSet
}
CellReselectionServiceParameterSet ::=   SEQUENCE (SIZE (1..maxNrOfService))
OF ServiceReselectionParameterSetIndex
ServiceReselectionParameterSetIndex ::=   SEQUENCE {
  serviceIndex                 INTEGER (0..maxNrOfServices),
  cellReselectionParameterSetIndex           INTEGER (0..maxNrOfServices)
}
```

According to the above example, the next generation radio access network (NG-RAN) node would have information about the registered slices from the access and mobility management function (AMF), communicated, e.g., in the initial context setup request message. In some embodiments, the AMF includes this information at the time of initial context setup request message and in some other embodiments, the radio access network (RAN) node can request this information from the core network on an as-needed basis. In some other embodiments, the RAN node can receive this information from the operation, administration and maintenance (OAM) function.

Format of Indication

The indication could be an integer value and point to the index of parameters. See above where it is described how the network node 16 may indicate a certain set of parameters by an index.

If the WD 22 has not received any indication from the network, such as via network node 16, regarding which parameter set the WD 22 is to apply, the WD 22 may apply a default set of parameters. The default set of parameters may be indicated as a first or any predetermined index e.g., indicating a slice list, service list or WD 22 category/type list.

Multiple Parameter Set Indications

The parameter set indication may indicate or include multiple parameter sets. The network, such as via network node 16, may indicate to the WD 22 that the WD 22 is to apply either parameter set 1 or parameter set 3, for example. The WD 22 may be configured to apply any of parameter set 1 or parameter set 3, and the WD 22 may select one of these if they are found. In some embodiments, the WD 22 could make such a selection based on what slice is prioritized in idle or inactive mode selection. For example, a WD 22 may apply idle/inactive mode frequency priority parameters that relate to a slice or a service that is considered more time-critical than another service or slice. For example, a WD 22 may select ultrareliable low latency communication (URLLC)-slice-related frequency priorities instead of mobile broad band (MBB)-slice-related frequency priorities in situations when it is registered to both such slices. This selection may occur when use of the URLLC slice is more time-critical.

In some embodiments, a WD 22 may choose to prioritize the MBB slice and follow the frequency priorities of that slice, since the use of MBB may be 100 times more frequent than use of URLLC. Also, use of the URLLC slice may be associated with a controlled startup and is not time-critical in an initial step. There could be various aspects that determine what slice, frequency, and/or service to prioritize when the WD 22 has a choice.

In some embodiments, the parameter set indications are associated with a priority. For example, a parameter set 3 may be given higher priority than parameter set 1. Then, the WD 22 will apply parameter set 3 if available, otherwise the WD 22 will apply parameter set 1. If none of the indicated parameter sets are found by the WD 22, the WD 22 may revert to selecting an alternative parameter set.

Absence of Indicated Parameter Set

If the WD 22 has received a parameter set indication but the corresponding parameter set is not detected, the WD 22 may apply a backup parameter set. The backup parameter set may be selected to be, for example:
  a default parameter set, e.g., the parameter set indicated in the legacy signaling;
  a random parameter set. If the WD 22 has been indicated to apply parameter set 2 but only parameter set 1 and 3 are detected by the WD 22, the WD 22 may select randomly between set 1 and set 3; or
  a parameter set indicated based on network signaling. The WD 22 may be provided with an indication of which backup parameter set the WD 22 is to apply if the WD 22 does not find the indicated parameter set.

UE Discards Parameter Set Indication

In one embodiment, the WD 22 may discard the parameter set indication upon certain events, examples of which may include:

WD capabilities change—The capabilities of a WD 22 may change. For example, a WD 22 may at first be capable of a feature X (e.g., Evolved Universal Terrestrial Radio Access Network New Radio-Dual Connectivity (EN-DC)) but for some reason, the WD 22 may no longer be capable of feature X. The WD 22 can then update its capabilities such that feature X is no longer supported. This may trigger the WD 22 to discard the parameter set indication.

A WD 22 moves out of a certain set of cells, tracking areas (TA) and/or/RAN based notification areas (RNA), etc.—If the WD 22 moves out of a certain set of cells, tracking areas, RAN areas, etc., the WD 22 may no longer keep and apply the indicated parameter set: hence the WD 22 may discard the parameter set indication.

Timer expires—The WD 22 may discard the parameter set upon expiry of a timer. The timer may be started upon reception of the parameter set indication, or upon transitioning from a first state to another state (e.g., from CONNECTED mode to IDLE mode). The timer may be (re)started if the WD 22 at a later point in time again performs such transition. For example, the WD 22 may receive an indication when moving from CONNECTED to IDLE mode but at a later point in time, the WD 22 may reconnect to the network (e.g., enters CONNECTED mode again). Then, the WD 22 may move from CONNECTED to IDLE again and the WD 22 may restart the timer.

The indicated parameter set is not found—If the WD 22 has received parameter set indication X, but the parameter set X is not provided from the network (at least not in the cell the WD 22 is camped on), then the WD 22 may discard the indication. This may be beneficial if the WD 22 has been configured to apply a parameter set X but the WD 22 moves to a cell which does not support this feature, or does not apply parameter set X.

The WD 22 changes state—The WD 22 may discard the indication if the WD 22 moves to a certain state. For example, the WD 22 may receive the indication when the WD 22 is moved to INACTIVE mode. If the WD 22 for some reason moves to IDLE mode, the WD 22 may discard the indication.

The WD 22 changes mobility state—The WD 22 may change from a slow mobility state to a high mobility state WD 22 (these states are based on the speedStateReselectionPars provided in the system information). Further, the WD 22 type specific reselection priorities may be applicable only to a certain mobility state, e.g., a slow speed WD state. The speed state for which the WD 22 type specific reselection priorities are applicable can be specific in the standard or explicitly indicated in the system information (SI), e.g., in CellReselectionPriorities.

The WD 22 deregisters from a certain slice. If a WD 22 has acquired a parameter set valid for a specific slice, and then the WD 22 deregisters from that slice, the parameter set is no longer valid.

When the WD 22 is said to "discard" the parameter set indication, the WD 22 may actually discard the value (e.g., by removing it from a memory), or it can consider the value no longer valid or applicable.

Network Selection—Selection by the Network of which Parameters a WD 22 is to Apply Based on the above methods, the network, such as via network node 16, can control which parameter set a certain WD 22 applies, considering one or more of the following:

WD capabilities—The network, such as via network node 16, may consider the capabilities of the WD 22 when determining which parameter set the WD 22 is to apply. For example, WDs which supports a feature X (e.g., EN-DC) may be assigned to a first set of parameters, while WDs which do not support feature X may be assigned to a second set of parameters. The network, such as via network node 16, may further consider on which bands the WD 22 supports a certain feature, and on which frequencies the network has enabled that feature. For example, a WD 22 which supports EN-DC may only support EN-DC between certain frequencies. The network, such as via network node 16, may consider this when selecting which parameter set the WD 22 is to apply. So even if a WD 22 is EN-DC capable, when WD 22 does not support EN-DC for a certain (e.g., wanted) frequency (combination) then the network, such as via network node 16, may not indicate that this WD 22 is to apply parameters which the network has designed to be suitable for EN-DC capable WDs.

The release of the WD 22—The WDs indicate to the network which release of the specifications they have implemented. The network may indicate that WDs of a first release are to apply a first set of parameters, while WDs of a second release may be assigned to a second set of parameters.

The mobility state of the WD 22—The network may consider the WD's mobility state (slow, medium, high) at the time of releasing the WD 22 to idle/inactive state when determining which parameter set the WD 22 is to apply. For example, a WD 22 of high speed may be configured with priorities that do not necessarily enable faster dual connectivity associated with high frequencies whereas a slow speed WD 22 is configured with priorities that enable faster EN-DC or NR-DC associated with a high frequency Primary Cell (PSCell).

Network Selection of which Parameters a WD Registered to More than One Slice is to Apply When the WD 22 is registered to more than one slice, or when the WD 22 is registered to the network in such a way that a selection of different services may become relevant for access, then according to one aspect, the WD 22 can determine which way it should prioritize a slice, frequency, and/or service. Based on the above methods, the network node 16 can control which parameter set a certain WD 22 is to apply. The network, such as via network node 16, may select which parameter set a certain WD 22 is to apply considering one or more of the following:

WD capabilities—The network, such as via network node 16, may consider the capabilities of the WD 22 when determining which parameter set the WD 22 is to apply. For example, WDs 22 which supports a feature X (e.g., EN-DC) may be assigned to a first set of parameters, while WDs 22 which do not support feature X may be assigned to a second set of parameters. The network node 16 may further consider on which bands the WD 22 supports a certain feature, and on which frequencies the network has enabled that feature. For example, a WD 22 which supports EN-DC may only support EN-DC between certain frequencies. The network may consider this when selecting which parameter set the WD 22 is to apply. So even if a WD 22 is EN-DC capable but the WD 22 does not support EN-DC for a certain frequency then the network may not indicate that this WD 22 is to apply parameters which the network has designed to be suitable for EN-DC capable WDs.

The release of the WD 22—The WDs 22 may indicate to the network, such as via network node 16, which release of the specifications they have implemented. The network may indicate that WDs 22 of a first release are to apply a first set of parameters, while WDs 22 of a second release may be assigned to a second set of parameters.

The mobility state of the WD 22—The network, such as via network node 16, may consider the WD 22's mobility state (slow, medium, high) at the time of releasing the WD 22 to idle/inactive state when determining which parameter set the WD 22 is to apply. For example, a WD 22 of high speed may be configured with priorities that do not necessarily enable faster dual connectivity associated with high frequencies, whereas a slow speed WD 22 may be configured with priorities that enable faster EN-DC or NR-DC associated with high frequency PSCell.

Configuration of the Network Nodes

In one embodiment, a central node of the network, (e.g., an OAM network node) determines the indices used for the different parameter sets. This may be seen as the central node that is coordinating the indices to use for the different parameter sets. The result of such coordination is then indicated to other network nodes 16, e.g., gNBs, in the network. The coordination may be such that all nodes in a certain area (e.g., a set of cells, set of Tracking Areas, set of RAN Areas, etc.) use the same index for a certain set of parameters. Alternatively, or in addition, the coordination may be such that a certain index is used for the particular type of devices.

From a slicing perspective, some embodiments offer the possibility to provide a frequency prioritization in a registration area where an operator has different preferences for the use of a specific slice.

Figure 11:
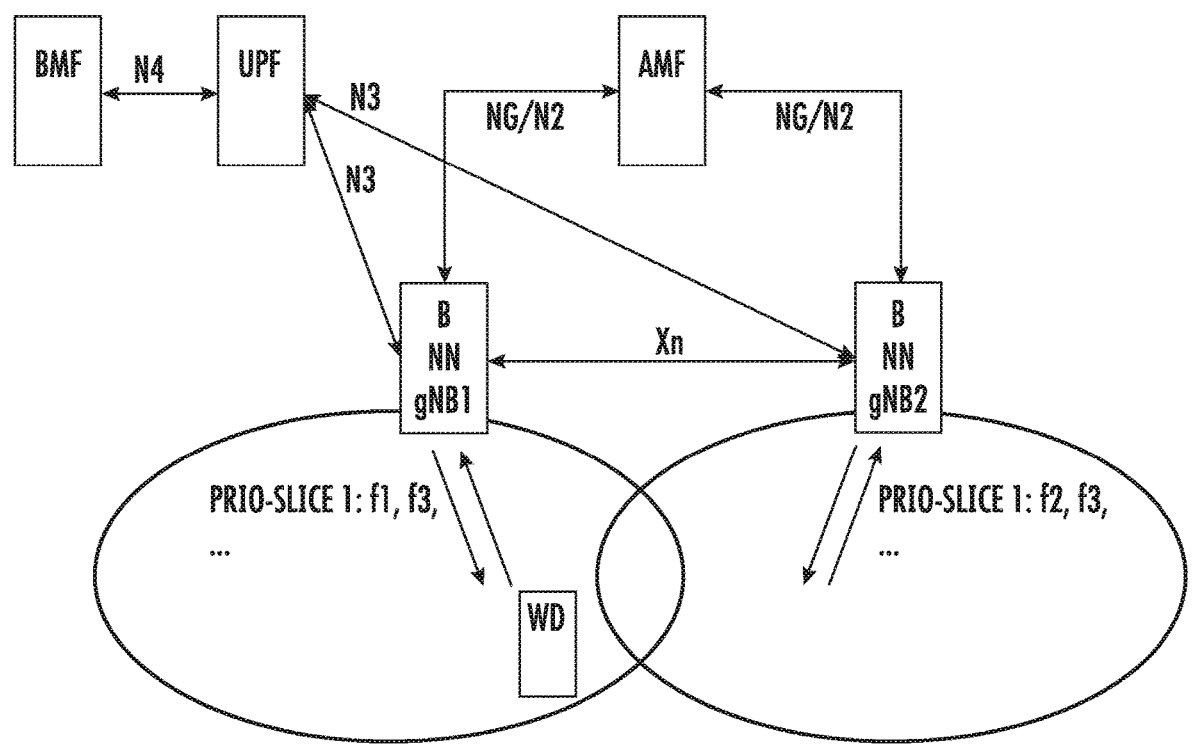
FIG. 11 is an example architecture of a wireless communication system configured to communicate parameter sets.

In the example architecture of FIG. 11, the network node 16 (NN), gNB1 broadcasts a certain set of frequencies for use of slice 1, whereas another cell broadcasts another set of frequencies for use of slice 1. If a WD 22 is coming from an area where f3 was used for slice 1, the WD 22 would switch to f1 if it was entering an area served by gNB1, whereas it would switch to f2 if it was entering an area served by the network node 16 (NN), gNB2. This would be possible by associating an index with the slice to which the WD 22 is registered, and by broadcasting frequency priorities that are valid in a certain area for this index. The index can, as described above, map either to a slice or to a service.

In one explicit example, an OAM network node determines that parameter sets for EN-DC will have index 2, and that is indicated to network nodes (gNBs) such that all network nodes (gNBs) use the same index for their EN-DC parameters, if any. The OAM network node may only provide such indication to network nodes which support a certain feature, in some embodiments. For example, if there is a parameter set for a feature X, then the central node, e.g., the OAM network node, may only indicate to the other network nodes (gNBs) which actually support feature X which index the parameters for feature X should use.

In some embodiments, the coordination between configurations and indices is done in a distributed manner between network nodes 16, such as gNBs. The source network node indicates to other network nodes s in the tracking area how the indices are used when releasing the WD 22.

Figure 12:
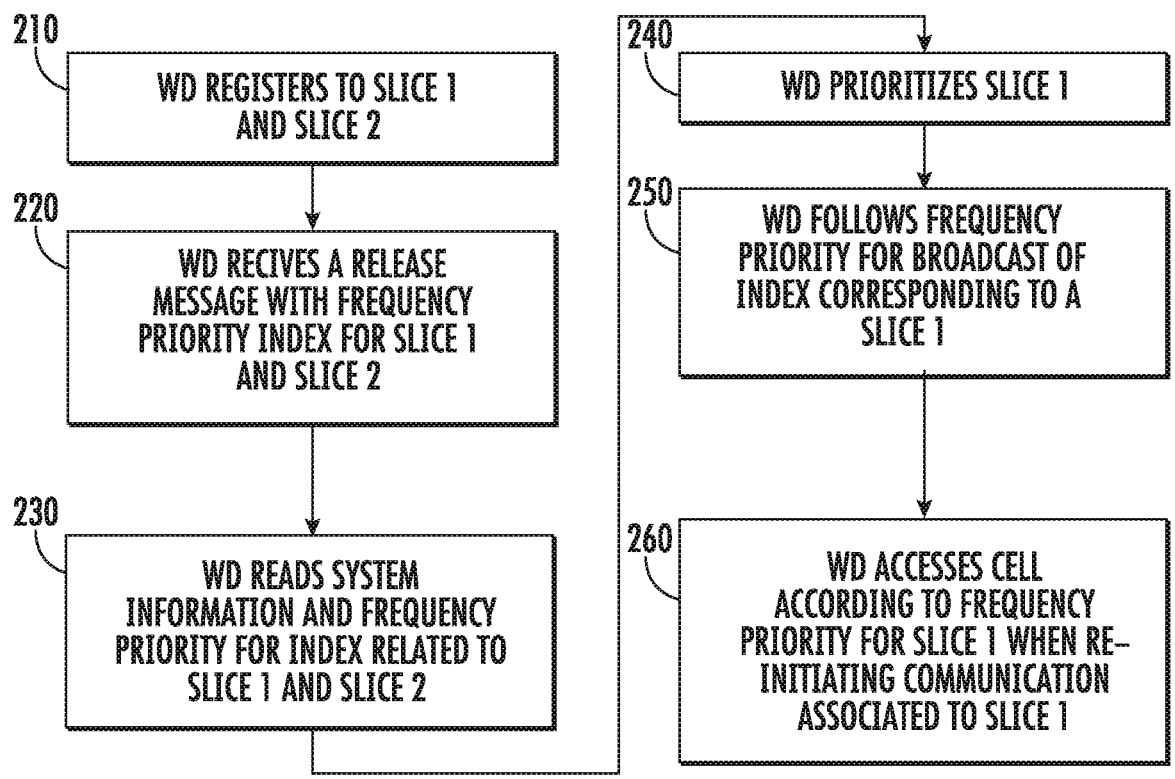
FIG. 12 is a flowchart of an exemplary process in a WD in accordance with principles set forth herein.

FIG. 12 is a flowchart of an exemplary process performed in the WD 22 according to some embodiments. A WD 22 is registering to two slices (Block S210). It may, in a release message, receive two index values, one for slice 1 and one for slice 2. These index values may be associated with broadcast system information (with the same index) and from this, the WD 22 may be able to know and follow varying frequency priorities in different cells it may reselect (Block S230). As the WD 22 cannot follow different priorities at the same time, there may be rules for how the WD 22 should select one set. In the example of FIG. 12, in Block S240, the WD 22 prioritizes slice 1. In Block S250, the WD 22 reselects according to frequency priorities for slice 1. In Block S260, slice 1 triggers an activity and the WD 22 would select access on the frequency indicated by the frequency priorities for slice 1.

When a WD 22 is reselecting another cell, it may read the information on frequency priority that is sent from that cell simply by following the index indication provided by the network in Block S220.

Figure 13:
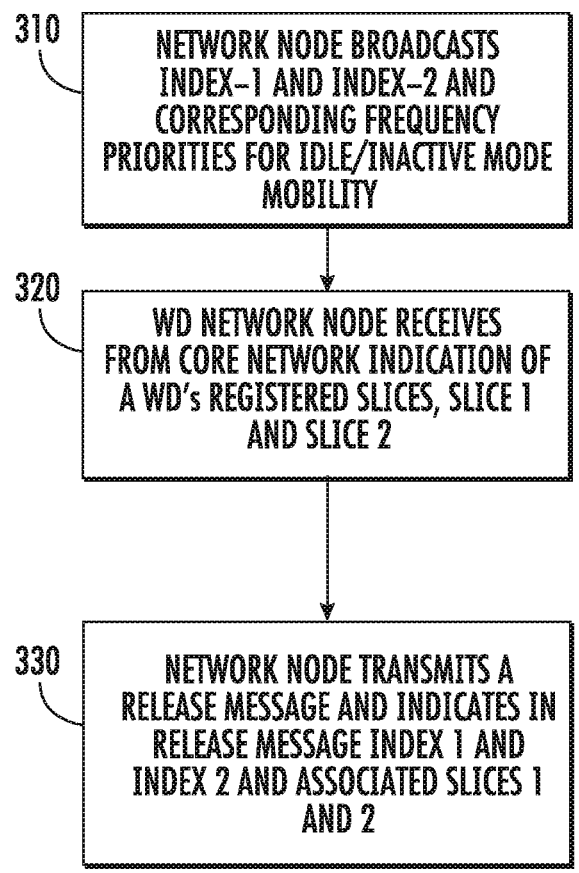
FIG. 13 is a flowchart of an exemplary process in a network node in accordance with principles set forth herein.

FIG. 13 is a flowchart of an exemplary process performed in the network node 16, such as a gNB, according to an example embodiment. The network node 16 (e.g., gNB) broadcasts parameters according to what slices are supported in the cell. In this example, index 1 and index 2 are given (Block S310). These two indexes map to two different slices, slice 1 and slice 2. It can also be that index 1 maps to several different slices and index 2 maps to other slices, or only one slice. In some embodiments, the network node 16 receives information indicating to which slices the WD 22 is registered (Block S320). This may make it possible for the network node 16 to transmit information to the WD 22 about frequency priorities it should follow for the different slices. This information is conveyed to the WD 22 in a release message (Block S330).

Some aspects may be implemented in the radio resource control (RRC) protocol of NR. Hence some parts may be implemented in a cloud, i.e., in one or more locations accessible via the Internet.

According to one aspect, a network node 16 configured to communicate with a plurality of wireless devices (WD) is provided. The network node 16 includes processing circuitry 68 configured to select an index indicating a set of parameters of a plurality of sets of parameters, a set of parameters including at least one priority, the selecting being based at least in part on one of a registered slice and a service, the index usable to configure at least one WD 22 of a first group of WDs 22 to select a frequency priority based at least in part on the selected index. The network node 16 includes a radio interface 62 in communication with the processing circuitry 68, the radio interface 62 configured to transmit the selected index to the at least one WD 22 of the first group of WDs 22.

According to this aspect, in some embodiments, the radio interface 62 is further configured to broadcast the plurality of sets of parameters to multiple wireless devices. In some embodiments, the radio interface is configured to unicast the plurality of sets of parameters to a particular one of the at least one WD 22 of the first group of WDs 22. In some embodiments, each set of parameters of the plurality of sets of parameters corresponds to a different one of a registered slice or a service. In some embodiments, one set of parameters of the plurality of sets of parameters is a default set of parameters. In some embodiments, the processing circuitry 68 is further configured to select multiple indices, each index of the multiple indices indicating a different set of parameters of the plurality of sets of parameters; and the radio interface is further configured to transmit the selected multiple indices to the at least one WD 22 of the first group of WDs 22. In some embodiments, a priority in a set of parameters directs the at least one WD 22 of the first group of WDs 22 to prioritize one slice or service over another slice or service. In some embodiments, the selecting is further based on a capability of the at least one WD 22 of the first group of WDs 22. In some embodiments, the selecting is further based on a mobility state of a particular one of the at least one WD 22 of the first group of WDs 22. In some embodiments, the processing circuitry 68 is further configured to select multiple indices, each index of the multiple indices indicating a different set of parameters of the plurality of sets of parameters; and the radio interface is further configured to transmit each selected one of the multiple indices to a different group of WDs 22.

According to another aspect, a method in a network node 16 configured to communicate with a plurality of wireless devices (WD) is provided. The method includes selecting, via the processing circuitry 68, an index indicating a set of parameters of a plurality of sets of parameters, a set of parameters including at least one priority, the selecting being based at least in part on one of a registered slice and a service, the index usable to configure at least one WD 22 of a first group of WDs 22 to select a frequency priority based at least in part on the selected index; and transmitting, via the radio interface 62 the selected index to the at least one WD 22 of the first group of WDs 22.

According to this aspect, in some embodiments, the method also includes broadcasting via the radio interface 61 the plurality of sets of parameters to multiple wireless devices. In some embodiments, the method includes unicasting the plurality of sets of parameters to a particular one of the at least one WD 22 of the first group of WDs 22. In some embodiments, each set of parameters of the plurality of sets of parameters corresponds to a different one of a registered slice or a service. In some embodiments, one set of parameters of the plurality of sets of parameters is a default set of parameters. In some embodiments, the method includes selecting, via the processing circuitry 68, multiple indices, each index of the multiple indices indicating a different set of parameters of the plurality of sets of parameters; and transmitting, via the radio interface 62, the selected multiple indices to the at least one WD 22 of the first group of WDs 22. In some embodiments, a priority in a set of parameters directs the at least one WD 22 of the first group of WDs 22 to prioritize one slice or service over another slice or service. In some embodiments, the selecting is further based on a capability of the at least one WD 22 of the first group of WDs 22. In some embodiments, the selecting is further based on a mobility state of a particular one of the at least one WD 22 of the first group of WDs 22. In some embodiments, the method includes selecting, via the processing circuitry 68 multiple indices, each index of the multiple indices indicating a different set of parameters of the plurality of sets of parameters; and transmitting, via the radio interface 62, each selected one of the multiple indices to a different group of WDs 22.

According to yet another aspect, a WD 22 is configured to communicate with a network node 16. The WD 22 includes processing circuitry 84 configured to: obtain an indication of a set of parameters of a plurality of sets of parameters, a set of parameters including at least one index and at least one frequency priority; and select a frequency priority from the set of parameters indicated by the obtained indication, the obtained indication corresponding to a prioritized slice.

According to this aspect, in some embodiments, the indication is obtained from the network node 16. In some embodiments, when no indication is obtained from the network node 16, the indication is one of a default indication and a random indication obtained from a memory of the WD 22. In some embodiments, the processing circuitry 84 is further configured to register the WD 22 to the corresponding prioritized slice. In some embodiments, the processing circuitry 84 is further configured to access a cell according to the selected frequency priority when reinitiating communication associated with the corresponding prioritized slice. In some embodiments, the processing circuitry 84 is further configured to: obtain multiple indices, each index of the multiple indices indicating a different set of parameters of the plurality of sets of parameters, and select a set of parameters among the sets of parameters indicated by the multiple indices, the selecting being based at least in part on a comparison of frequency priorities of different sets of parameters indicated by the multiple indices. In some embodiments, the processing circuitry 84 is further configured to discard, ignore or deem as invalid, the obtained indication upon an occurrence of at least one of: the WD 22 lacking a capability for the prioritized slice; a timer expiring; the indicated set of parameters being unavailable at the WD 22; the WD 22 changing to an IDLE state; the WD 22 changing a mobility state; and the WD 22 deregistering from the prioritized slice. In some embodiments, the WD 22 further includes a radio interface 82 configured to receive the obtained indication from the network node 16 on a broadcast channel. In some embodiments, the WD 22 further includes a radio interface 82 configured to receive the plurality of sets of parameters from the network node 16. In some embodiments, the obtained indication is received from the network node 16 in an RRCRelease message usable to move the WD 22 from one state to another state.

According to another embodiments, a method in a wireless device 22 includes: obtaining an indication of a set of parameters of a plurality of sets of parameters, a set of parameters including at least one index and at least one frequency priority; and selecting a frequency priority from the set of parameters indicated by the obtained indication, the obtained indication corresponding to a prioritized slice.

According to this aspect, in some embodiments, the indication is obtained from the network node 16. In some embodiments, when no indication is obtained from the network node 16, the indication is one of a default indication and a random indication obtained from a memory 88 of the WD 22. In some embodiments, the method also includes registering the WD 22 to the corresponding prioritized slice. In some embodiments, the method also includes accessing a cell according to the selected frequency priority when reinitiating communication associated with the corresponding prioritized slice. In some embodiments, the method further includes obtaining multiple indices, each index of the multiple indices indicating a different set of parameters of the plurality of sets of parameters, and selecting a set of parameters among the sets of parameters indicated by the multiple indices, the selecting being based at least in part on a comparison of frequency priorities of different sets of parameters indicated by the multiple indices. According to this aspect, in some embodiments, the method also includes, via the processing circuitry 84, discarding, ignoring or deeming as invalid, the obtained indication upon an occurrence of at least one of: the WD 22 lacking a capability for the prioritized slice; a timer expiring; the indicated set of parameters being unavailable at the WD 22; the WD 22 changing to an IDLE state; the WD 22 changing a mobility state; and the WD 22 deregistering from the prioritized slice. In some embodiments, the method also includes receiving the via the radio interface 82, obtained indication from the network node 16 on a broadcast channel. In some embodiments, the method also includes receiving, via the radio interface 82, the plurality of sets of parameters from the network node 16. In some embodiments, the obtained indication is received from the network node 16 in an RRCRelease message usable to move the WD 22 from one state to another state.

According to one aspect, a network node 16 is configured to communicate with a wireless device (WD). The network node 16 includes a radio interface 62 and/or processing circuitry 68 configured to transmit to the WD 22, an index indicating a set of parameters of a plurality of sets of parameters, the parameters in a set including at least one threshold and at least one priority, the index used to configure the WD 22 to select a frequency priority based at least in part on the index.

According to this aspect, in some embodiments, the index is one of a set of indices received from a central node in communication with the network node 16 and other network nodes. In some embodiments, the network node 16 selects the index based on a registered slice or service.

According to another aspect, a method implemented in a network node 16 in communication with a wireless device, WD 22, includes transmitting to the WD 22, an index indicating a set of parameters of a plurality of sets of parameters, the parameters in a set including at least one threshold and at least one priority, the index used to configure the WD 22 to select a frequency priority based at least in part on the index.

According to this aspect, in some embodiments, the index is one of a set of indices received from a central node in communication with the network node 16 and other network nodes. In some embodiments, the network node 16 selects the index based on a registered slice or service.

According to yet another aspect, a WD 22 configured to communicate with a network node 16, includes a radio interface 82 and/or processing circuitry 84 configured to: obtain an indication of a set of parameters of a plurality of sets of parameters, the parameters in a set including at least one threshold and at least one priority, the index used to configure the WD 22 to select a frequency priority based at least in part on the index; and select one of a network slice, frequency and service, based at least in part on a threshold included in the set of parameters.

According to this aspect, in some embodiments, the indication is obtained from the network node 16. In some embodiments, when no indication is obtained from the network node 16, the WD 22 obtains a default indication of a set of parameters from a memory of the WD 22. In some embodiments, the indication indicates more than one set from which the WD 22 chooses based at least in part on whether an indicated set is stored in a memory of the WD 22.

According to another aspect, a method implemented in a wireless device includes obtaining an indication of a set of parameters of a plurality of sets of parameters, the parameters in a set including at least one threshold and at least one priority, the index used to configure the WD 22 to select a frequency priority based at least in part on the index. The method further includes selecting one of a network slice, frequency and service, based at least in part on a threshold included in the set of parameters.

According to this aspect, in some embodiments, the indication is obtained from the network node 16. In some embodiments, when no indication is obtained from the network node 16, the WD 22 obtains a default indication of a set of parameters from a memory of the WD 22. In some embodiments, the indication indicates more than one set from which the WD 22 chooses based at least in part on whether an indicated set is stored in a memory of the WD 22.

Some embodiments include the following:

Embodiment A1. A network node configured to communicate with a wireless device (WD), the network node configured to, and/or comprising a radio interface and/or comprising processing circuitry configured to:
transmit to the WD, an index indicating a set of parameters of a plurality of sets of parameters, the parameters in a set including at least one threshold and at least one priority, the index used to configure the WD to select a frequency priority based at least in part on the index.

Embodiment A2. The network node of Embodiment A1, wherein the index is one of a set of indices received from a central node in communication with the network node and other network nodes.

Embodiment A3. The network node of Embodiment A1, wherein the network node selects the index based on a registered slice or service.

Embodiment B1. A method implemented in a network node in communication with a wireless device, WD, the method comprising:
transmitting to the WD, an index indicating a set of parameters of a plurality of sets of parameters, the parameters in a set including at least one threshold and at least one priority, the index used to configure the WD to select a frequency priority based at least in part on the index.

Embodiment B2. The method of Embodiment B1, wherein the index is one of a set of indices received from a central node in communication with the network node and other network nodes.

Embodiment B3. The method of Embodiment B1, wherein the network node selects the index based on a registered slice or service.

Embodiment C1. A wireless device (WD) configured to communicate with a network node, the WD configured to, and/or comprising a radio interface and/or processing circuitry configured to:
obtain an indication of a set of parameters of a plurality of sets of parameters, the parameters in a set including at least one threshold and at least one priority, the index used to configure the WD to select a frequency priority based at least in part on the index; and
select one of a network slice, frequency and service, based at least in part on a threshold included in the set of parameters.

Embodiment C2. The WD of Embodiment C1, wherein the indication is obtained from the network node.

Embodiment C3. The WD of Embodiment C2, wherein, when no indication is obtained from the network node, the WD obtains a default indication of a set of parameters from a memory of the WD.

Embodiment C4. The WD of Embodiment C1, wherein the indication indicates more than one set from which the WD chooses based at least in part on whether an indicated set is stored in a memory of the WD.

Embodiment D1. A method implemented in a wireless device (WD), the method comprising:
obtaining an indication of a set of parameters of a plurality of sets of parameters, the parameters in a set including at least one threshold and at least one priority, the index used to configure the WD to select a frequency priority based at least in part on the index;

selecting one of a network slice, frequency and service, based at least in part on a threshold included in the set of parameters.

Embodiment D2. The method of Embodiment D1, wherein the indication is obtained from the network node.

Embodiment D3. The method of Embodiment D2, wherein, when no indication is obtained from the network node, the WD obtains a default indication of a set of parameters from a memory of the WD.

Embodiment D4. The method of Embodiment D1, wherein the indication indicates more than one set from which the WD chooses based at least in part on whether an indicated set is stored in a memory of the WD.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A network node configured to communicate with a plurality of wireless devices, WD, the network node comprising:
    processing circuitry configured to select an index indicating a set of parameters of a plurality of sets of parameters, the set of parameters including at least one frequency priority, the selecting of the index being based at least in part on a network slice for which a corresponding WD is registered and a service served to the corresponding WD on the network slice, the index usable to configure at least one WD of a first group of WDs to select a frequency priority of the at least one frequency priority of the set of parameters based at least in part on the selected index; and
    a radio interface in communication with the processing circuitry, the radio interface configured to transmit the selected index to the at least one WD of the first group of WDs.

2. The network node of claim 1, wherein the radio interface is further configured to broadcast the plurality of sets of parameters to multiple wireless devices.

3. A method in a network node configured to communicate with a plurality of wireless devices, WD, the method comprising:

selecting an index indicating a set of parameters of a plurality of sets of parameters, the set of parameters including at least one frequency priority, the selecting of the index being based at least in part on a network slice for which a corresponding WD is registered and a service served to the corresponding WD on the network slice, the index usable to configure at least one WD of a first group of WDs to select a frequency priority of the at least one frequency priority of the set of parameters based at least in part on the selected index; and transmitting the selected index to the at least one WD of the first group of WDs.

4. The method of claim 3, further comprising broadcasting the plurality of sets of parameters to multiple wireless devices.

5. The method of claim 3, further comprising unicasting the plurality of sets of parameters to a particular one of the at least one WD of the first group of WDs.

6. The method of claim 3, wherein each set of parameters of the plurality of sets of parameters corresponds to a different one of a registered slice or a service.

7. The method of claim 3, wherein one set of parameters of the plurality of sets of parameters is a default set of parameters.

8. The method of claim 3, further comprising:
selecting multiple indices, each index of the multiple indices indicating a different set of parameters of the plurality of sets of parameters; and
transmitting the selected multiple indices to the at least one WD of the first group of WDs.

9. The method of claim 3, wherein a priority in a set of parameters directs the at least one WD of the first group of WDs to prioritize one slice or service over another slice or service.

10. The method of claim 3, wherein the selecting is further based on a capability of the at least one WD of the first group of WDs.

11. The method of claim 3, wherein the selecting is further based on a mobility state of a particular one of the at least one WD of the first group of WDs.

12. A wireless device, WD, configured to communicate with a network node, the WD comprising processing circuitry configured to:
obtain an indication including an index indicating a set of parameters of a plurality of sets of parameters, set of parameters including at least one frequency priority, the index being based at least in part on a network slice for which the WD is registered and a service served to the WD on the network slice; and
select a frequency priority from the set of parameters indicated by the obtained indication.

13. The WD of claim 12, wherein the indication is obtained from the network node.

14. A method in a wireless device, WD, configured to communicate with a network node, the method comprising:
obtaining an indication indicating an index indicating a set of parameters of a plurality of sets of parameters, set of parameters including at least one frequency priority, the index being based at least in part on a network slice for which the WD is registered and a service served to the WD on the network slice; and
selecting a frequency priority from the set of parameters indicated by the obtained indication.

15. The method of claim 14, wherein the indication is obtained from the network node.

16. The method of claim 15, wherein, when no indication is obtained from the network node, the indication is a default indication or a random indication obtained from a memory of the WD.

17. The method of claim 14, further comprising registering the WD to the corresponding prioritized slice.

18. The method of claim 14, further comprising accessing a cell according to the selected frequency priority when reinitiating communication associated with the corresponding prioritized slice.

19. The method of claim 14, further comprising:
obtaining multiple indices, each index of the multiple indices indicating a different set of parameters of the plurality of sets of parameters, and
selecting a set of parameters among the sets of parameters indicated by the multiple indices, the selecting being based at least in part on a comparison of frequency priorities of different sets of parameters indicated by the multiple indices.

20. The method of claim 14, further comprising discarding, ignoring or deeming as invalid, the obtained indication upon an occurrence of at least one of:
the WD lacking a capability for the prioritized slice;
a timer expiring;
the indicated set of parameters being unavailable at the WD;
the WD changing to an IDLE state;
the WD changing a mobility state; and
the WD deregistering from the prioritized slice.

21. The method of claim 14, further comprising receiving the obtained indication from the network node on a broadcast channel.

22. The method of claim 14, further comprising receiving the plurality of sets of parameters from the network node.

* * * * *